July 14, 1959  H. EBER ET AL  2,894,436
CAMERA FOR PHOTOGRAPHING THE INNER SURFACE OF A HOLLOW BODY
Filed Sept. 9, 1954  2 Sheets-Sheet 1

*Inventors.*
HANS EBER AND
PAUL RUF
BY:

United States Patent Office 2,894,436
Patented July 14, 1959

2,894,436
CAMERA FOR PHOTOGRAPHING THE INNER SURFACE OF A HOLLOW BODY

Hans Eber, Freiburg, and Paul Ruf, Emmendingen, Germany, assignors to Lytax-Werke G.m.b.H., Freiburg, Germany Application September 9, 1954, Serial No. 454,867

Claims priority, application Germany September 18, 1953

4 Claims. (Cl. 95—11)

The present invention relates to cameras and in particular to cameras for photographing the inner surfaces of hollow bodies, such as, for example, the inner surface of a tubular member.

Making a 1 to 1 photograph of the inner surface of hollow bodies such as tubular members is generally very difficult particularly when the inner diameter thereof varys.

It is an object of this invention to provide a camera capable of easily and quickly making accurate photographs of the inner surface of a hollow body, particularly an inner surface of revolution, preferably at a 1 to 1 scale.

Another object of the present invention is to provide such a camera with a means for automatically focusing the camera in a stepless manner in accordance with the actual diameter of an annular surface to be photographed while the unrolled length of said annular surface is reproduced on a predetermined length of film.

An additional object of the present invention is to provide such a camera with a means for automatically causing the camera to move, during photographing of a given surface, a film strip a distance equal to the unrolled length of the surface being photographed irrespective of the diameter of said surface.

Furthermore, it is an object of the present invention to provide such a camera with a means for releasably positioning the same for rotation in the hollow body about the optical axis of the camera and for preventing movement of the camera along the axis of the surface of revolution being photographed.

Also, it is an object of the present invention to provide a camera capable of accomplishing all of the above objects and at the same time being made of simple and ruggedly constructed parts which are very reliable in operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
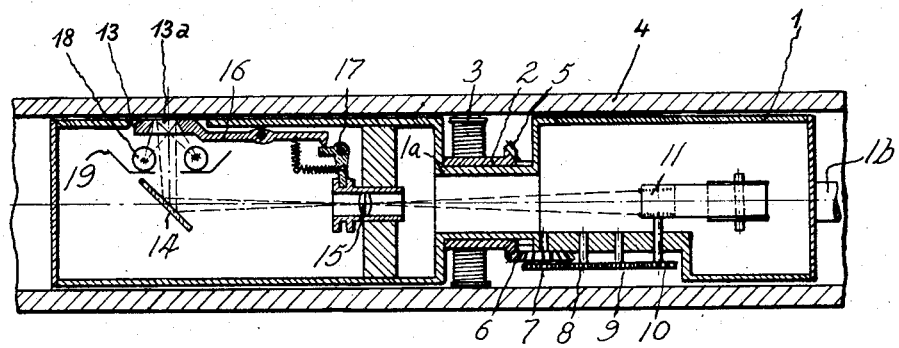
Fig. 1 is a sectional view through a tubular member whose inner surface is to be photographed and a camera constructed in accordance with the present invention and located within the tubular member.

Referring now to the drawing, it will be seen that the camera of the invention includes an elongated substantially tubular camera housing 1 having an intermediate cylindrical portion 1a of reduced cross section (Fig. 1), the portion of housing 1 to the right of part 1a, as viewed in Fig. 1, accommodating the film, and the portion of housing 1 to the left of intermediate part 1a accommodating the light guiding means for guiding light from the surface to be photographed to the film. It will be noted that the cylindrical portion 1a has its axis in coincidence with the optical axis of the camera.

Figure 3:
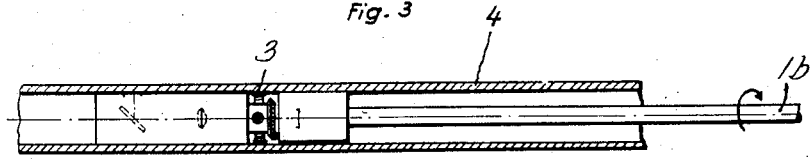
Fig. 3 is a view on a smaller scale of the structure of Fig. 1 showing in particular the manner in which the camera is moved during use thereof.

A cylindrical sleeve 2 is located about the portion 1a of the camera housing to support the latter for rotation about the optical axis, and a rod 1b is fixed to and extends from the right end wall of the camera housing, as shown particularly in Fig. 3, so that upon rotation of rod 1b, either by hand or by a suitable motor or the like, the camera housing 1 is rotated about the optical axis.

In the particular example shown in the drawing, the hollow body whose inner surface is to be photographed is in the form of an elongated cylindrical tube 4. A plurality of electromagnets 3, four in the particular example illustrated, are fixed to and extend radially from the sleeve 2 into engagement with the inner surface of hollow body 4 so that when these electromagnets are energized by any suitable leads and an electrical circuit (not shown) the sleeve 2 will be releasably fixed in a predetermined position within the hollow body 4 and the camera housing 1 also will be positioned in this way within the body 4 against movement along the axis thereof but freely turnable about the optical axis. The cores of magnets 3 may be adjustable in length as by being made of telescoped threadedly connected members, so that the magnets may be adjusted to engage inner surfaces of different diameters. It is pointed out that instead of electromagnets 3 any suitable mechanical means, such as spreadable levers or the like operable from the exterior of hollow body 4, may be used to releasably position the camera within the hollow body.

Figure 4:
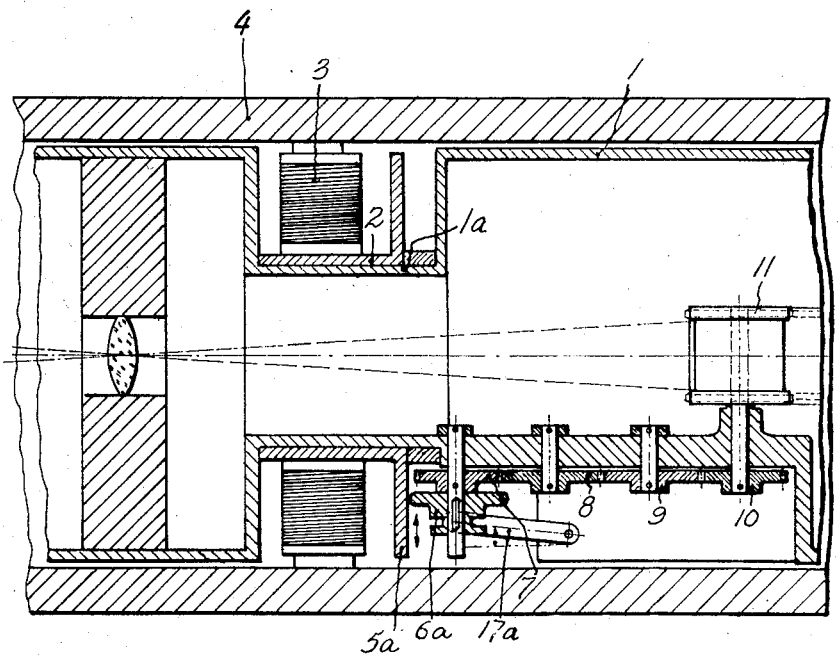
Fig. 4 is a fragmentary sectional view on an enlarged scale, corresponding to Fig. 1, of a different embodiment of a camera constructed in accordance with the present invention.

According to the present invention it is possible to automatically accommodate the camera to different diameters of a surface of revolution to be photographed either by automatically focusing the camera in accordance with the diameter of a particular surface of revolution or by automatically regulating the film moving means in such a way that the latter means automatically moves during one revolution of the camera an unrolled length of film equal to the length of the annular surface of revolution to be photographed. The embodiment of Figs. 1–3 shows an arrangement where the camera is automatically focused in accordance with the diameter of the surface of revolution being photographed, while the embodiment of Fig. 4 shows an arrangement where the film moving means is automatically adjusted.

Figure 2:
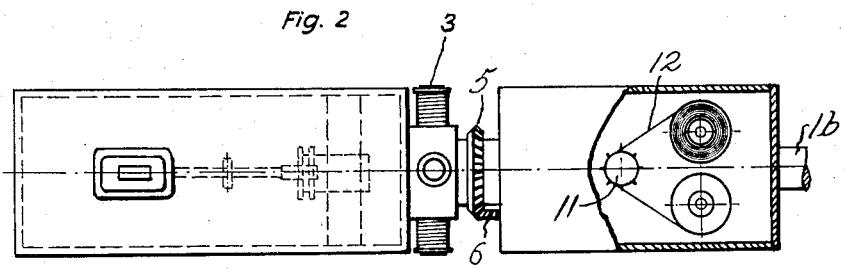
Fig. 2 is a partly sectional plan view of the camera of Fig. 1.

Thus, with the embodiment of Figs. 1–3, a predetermined unchanging length of film will be moved with each revolution of the camera about the optical axis. The structure for moving the film includes an annular bevel gear 5 extending radially from the sleeve 2 at the right end thereof, as viewed in Fig. 1, and meshing with a bevel gear 6 turnably carried by the camera and having a gear 7 fixed thereto for rotation therewith. The gear 7 forms part of a gear train 7, 8, 9, 10 which moves, through a toothed film transporting member 11, a predetermined length of film during each revolution of the camera. It will be noted that the film transporting roller 11 is actuated simply by the turning of the camera about the optical axis since the gear 5 is stationary and the gear 6 is caused by rotation of the camera to ride around the gear 5 and in this way drive the film moving means.

A wall portion of the camera housing 1 located adjacent the left end thereof, as viewed in Fig. 1, is formed with an opening 13 through which an end portion of a feeler member 16 extends. This feeler member 16 is pivotally mounted intermediate its ends within the camera housing and is urged by a coil spring located adjacent the right end of member 16, as shown in Fig. 1, to turn in a clockwise direction, as viewed in Fig. 1, so that the left free end portion of the feeler 16 is urged outwardly through the opening 13 into engagement with the surface to be photographed. This left free end portion of feeler 16 may, if desired, be provided with friction reducing rollers or the like engaging the surface to be photographed and is formed with an exposure aperture 13a defining the limited area being photographed at a given instant. A pair of lamps 18 are located within the housing 1 for illuminating the surface to be photographed, and the reflectors 19 serve to direct the light from the lamps 18 to the opening 13a as well as to prevent this light from passing directly to objective 15. This objective 15 is supported within the camera housing for shifting movement along the optical axis, and the lens barrel is formed at its exterior with an annular groove into which a free end of a bell crank 17 freely extends, as is most clearly shown in Fig. 1. The bell crank 17 is pivotally mounted within the camera, has its free end portion distant from objective 15 in engagement with the right free end of feeler member 16, as viewed in Fig. 1, and is urged by a coil spring, shown in Fig. 1, to turn in a clockwise direction, so that feeler 16 and bell crank 17 are always in engagement with each other. It is apparent that as the feeler 16 turns to a greater or lesser extent through the opening 13 into engagement with a surface to be photographed, the objective 15 will automatically be shifted so that the camera is automatically focused in accordance with the diameter of the surface of revolution to be photographed. A reflector 14 is located within the camera housing, extending across the optical axis, and makes an angle of 45° therewith for reflecting the picture "seen" through aperture 13a along the optical axis through the objective 15 and to the film.

The operation of the above-described structure is believed to be self-evident. After the camera is located within the hollow body at the desired picture-taking position, the magnets 3 are energized to releasably fix the camera in this position, and the feeler 16 automatically is located in engagement with the surface of revolution to be photographed to focus the camera automatically. Then the rod 1b is turned one revolution so that in this way the entire unrolled length of a portion of the surface of revolution is photographed. It will be noted that irrespective of the diameter of the surface of revolution, it is photographed on the same length of film with the embodiment of Figs. 1–3. After one such revolution of a camera, the magnets 3 are deenergized and the entire camera is axially shifted through a distance corresponding to the width of the exposure aperture 13a, measured in axial direction of the hollow body, which, at a 1 to 1 ratio, is the same as the width of the film strip, and the next annular surface of revolution is photographed in the same way so that by repeating the above operations the entire inner surface of a hollow body may be photographed.

According to the embodiment of Fig. 4, the structure for adjusting the objective automatically in accordance with different diameters of the surface of revolution is omitted and instead the film moving means is adjusted to move during one revolution of the camera a length of film exactly equal to the unrolled length of the annular surface photographed. In Fig. 4 the parts which are of the same construction as the embodiment of Figs. 1–3 are indicated with the same reference characters. Thus, it will be seen from Fig. 4 that instead of a bevel gear 5, an annular plate 5a is fixed to and extends radially from the right end of sleeve 2, a viewed in Fig. 4, this plate 5a being located in a plane normal to the optical axis. Instead of a bevel gear 6 meshing with another bevel gear, a friction wheel 6a frictionally engages the right side face of plate 5a to rotate with respect to the latter during rotation of the camera, members 5a and 6a forming a pair of motion transmitting members in much the same way as bevel gears 5 and 6. The friction wheel 6a is mounted for slidable movement along the shaft carrying the gear 7 of the gear train 7—10 and is constrained to rotate this shaft through any suitable means, such as a key and keyway. The friction wheel 6a is formed adjacent its lower end, as viewed in Fig. 4, with an annular groove into which a pin fixed to a lever 17a extends. This lever 17a is turned by the same structure which turns lever 17 of Fig. 1. For example, the lever 17a may be provided with a crank having a free end located to the right of the pivot axis of lever 17a, as viewed in Fig. 4, and engaging the free end of an elongated feeler member similar to member 16 pivotally mounted intermediate its ends on the outer surface of the camera, engaging the free end of the crank, and urged at its end distant from the crank toward the inner surface of the hollow body to be photographed. As the diameter of the surface of revolution to be photographed increases the lever 17a is turned in a counterclockwise direction, as viewed in Fig. 4, to shift friction wheel 6a radially away from the optical axis and thereby increase the length of film moved during a revolution of the camera, the dimensions of the parts being such that this length of film always is equal to the unrolled length of the annular surface of revolution being photographed.

Many details of the camera which have nothing whatever to do with the invention and which are known to every person skilled in the art are omitted from the description and drawings for the sake of conciseness.

In order to increase the range of sizes through which the camera may be used, it is possible to combine the embodiment of Fig. 4 with that of Figs. 1–3.

It will be understood that each of the elements described above, or two or more together, may also find a useful application in other types of cameras differing from the types described above.

While the invention has been illustrated and described as embodied in cameras for photographing an inner surface of revolution of a hollow body, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera for photographing the inner surface of a hollow body, in combination, a camera housing adapted to be located within the hollow body and having an outer wall formed with an opening passing therethrough; a feeler member movably mounted in said camera housing and having an end portion extending through said opening to engage the surface to be photographed, said end portion being formed with an exposure aperture; means engaging said feeler member for urging said end portion thereof outwardly through said opening; an objective carried by said camera; a reflector carried by said camera for reflecting light passing through said aperture to said objective; and adjusting means interconnecting said feeler member and objective for automatically focusing the latter in accordance with the extent to which said end portion of said feeler member extends beyond said outer wall of said camera housing.

2. In a camera for photographing the inner surface of a hollow body, comprising, in combination, a camera housing adapted to be located within the hollow body and having an outer wall formed with an opening passing therethrough; a feeler member movably mounted in said camera housing and having an end portion extending through said opening to engage the surface to be photographed, said end portion being formed with an exposure aperture; means carried by said camera for supporting the same in a predetermined position in the hollow body and for rotation about the optical axis of the camera; means engaging said feeler member for urging said end portion thereof outwardly through said opening; an objective carried by said camera; a reflector carried by said camera for reflecting light passing through said aperture to said objective; and stepless adjusting means interconnecting said feeler member and objective for automatically focusing the latter in accordance with the extent to which said end portion of said feeler member extends beyond said outer wall of said camera housing.

3. In a camera for photographing the inner surface of a hollow body, in combination, a camera housing adapted to be located within the hollow body and having an outer wall formed with an opening passing therethrough; an elongated feeler member pivotally mounted intermediate its ends in said housing and having an end portion extending through said opening to engage the surface to be photographed, said end portion being formed with an exposure aperture; means engaging said feeler member for urging said end portion thereof outwardly through said opening; an objective carried by said camera for shifting movement along the optical axis for focusing the camera; a reflector carried by said camera for reflecting light passing through said aperture to said objective; and a bell crank pivotally mounted in said camera, having one end engaging a portion of said feeler member to be moved thereby, and having an opposite end engaging said objective to shift the latter along the optical axis upon pivoting of said feeler member, whereby said objective is automatically focused.

4. A camera arrangement for photographing an annular inner surface portion of a tubular body, comprising in combination, a camera; means for mounting said camera within said tubular body for rotation about the axis thereof and in a position adapted to take during such rotation a picture of the annular inner surface portion of said tubular body to be photographed; film moving means in said camera for moving a predetermined length of film in fixed relation to the angular movxement of said camera during said rotation; optical means in said camera including an objective lens for transmitting light from said annular inner surface portion to said film, said lens being movable in direction of its optical axis for focusing the image of said annular portion on said film; gauging means carried by said camera for continuously determining the radius of said annular inner surface portion being photographed and variations of said radius during photographing of said annular inner surface portion; and adjusting means controlled by said gauging means for steplessly moving said lens into focusing position with respect to said annular surface portions to be photographed depending upon said determined inner radius and variations thereof during photographing of said annular inner surface portion so as to adjust the camera during photographing to the inner radius of the annular inner surface portion being photographed and variations thereof, for producing on a predetermined length of film with every full revolution of said camera an accurate picture of a complete annular inner surface portion of said tubular body irrespective of the actual radius thereof.

References Cited in the file of this patent

UNITED STATES PATENTS

| 1,658,537 | Reinhold | Feb. 7, 1928 |
| 2,364,362 | Hopkins | Dec. 5, 1944 |
| 2,418,230 | Jacobson | Apr. 1, 1947 |
| 2,667,109 | Piety | Jan. 26, 1954 |
| 2,737,864 | Gutterman et al. | Mar. 13, 1956 |

FOREIGN PATENTS

| 19,215 | Great Britain | 1913 |
| 287,488 | Germany | Sept. 25, 1915 |
| 616,842 | Great Britain | Jan. 27, 1949 |